3,442,872
Patented May 6, 1969

---

3,442,872
HIGH MOLECULAR WEIGHT TERPOLYMERS OF MALEIC ANHYDRIDE, ETHYLENE AND DICYCLOPENTADIENE
Helmut Korbanka, Hofheim, Taunus, Günther Tauber, Eddersheim am Main, and Hansjorg Vollmann, Frankfurt am Main, Germany, assignors to Farbwerke Hoechst Aktiengesellschaft vormals Meister Lucius & Brüning, Frankfurt am Main, Germany, a corporation of Germany
No Drawing. Filed Jan. 25, 1966, Ser. No. 522,845
Claims priority, application Germany, Feb. 5, 1965,
F 45,150
Int. Cl. C08f 15/40
U.S. Cl. 260—78.5    5 Claims

---

ABSTRACT OF THE DISCLOSURE

High molecular weight terpolymers of maleic anhydride, ethylene and dicyclopentadiene, and a method of making the polymers are disclosed. The polymers may be prepared by copolymerizing equimolar quantities of ethylene and maleic anhydride with 0.01 to 2.5% of dicyclopentadiene in the presence of a free radical liberating compound and a solvent at a temperature of 40° to 120° C. and under a pressure of 10 to 100 atmospheres. The polymers are useful, especially in the form of their salts, as thickening agents, dispersing agents and emulsifying auxiliaries.

---

The present invention relates to terpolymers from maleic anhydride, ethylene and a diene.

It is known that maleic anhydride can be copolymerized with olefins. Alternating copolymers are obtained which have relatively low molecular weights. For various fields of application, however, copolymers having high molecular weights are of great importance. Therefore, terpolymers from olefins, maleic anhydride and hexadiene-1,5 have been prepared (cf. U.S. Patent 3,060,155). When hexadiene-1,5 is added in the polymerization as third component, the molecular weight rises with increasing amount of hexadiene. With comparable concentrations pentadiene and substituted pentadienes do not bring about an increase of the molecular weight, whereas higher dienes than hexadiene-1,5 lead to the formation of swollen products that are no longer soluble.

The known process for the manufacture of terpolymers of high molecular weight from olefins, maleic anhydride and hexadiene-1,5, however, presents disadvantages in that it is difficult to obtain products of very high molecular weight which are free from soaked particles. Moreover, relatively high amounts of hexadiene are required. This may involve that the properties of the terpolymers depart in an undesired manner from those of pure olefin-maleic anhydride copolymers.

The present invention provides terpolymers of high molecular weight from ethylene, maleic anhydride and a diene, which contain as diene component 0.01 to 2.5% by weight, preferably 0.01 to 2% by weight of dicyclopentadiene, calculated on the amount by weight of the copolymer.

The present invention furthermore provides a process for preparing terpolymers of high molecular weight from ethylene, maleic anhydride and a diene, which comprises polymerizing ethylene with maleic anhydride and 0.1 to 2.5% by weight, preferably 0.1 to 2% by weight of dicyclopentadiene, calculated on the weight of the reacting monomers except dicyclopentadiene, in the presence of compounds forming radicals, advantageously under elevated pressure and at elevated temperature.

Besides dicyclopentadiene the terpolymers according to the invention essentially contain equimolecular amounts of maleic anhydride and ethylene. Polymers having especially favorable properties are obtained when 0.3 to 1.5% by weight of dicyclopentadiene, calculated on the reacting monomers except dicyclopentadiene, are added to the polymerization mixture.

The copolymerization can be carried out batchwise or continuously. It is appropriate to mix the components participating in the reaction prior to the reaction. It is likewise possible, however, to add single reactants during the reaction.

The copolymerization is carried out in the presence of a solvent or diluent. With low concentrations of monomers products are obtained having particularly favorable solubility and viscosity properties. The amount of solvent or diluent to be used should be so large that the amount of forming copolymer is at most 25% by weight, advantageously at most 15% by weight of the total amount of all substances present at the end of the reaction.

As solvents there may be used, on principle, all substances that are liquid under the reaction conditions and do not prevent polymerization, for example aliphatic and aromatic hydrocarbons, halogenated hydrocarbons, ketones, ethers, esters, and acetals. Solvents which react under the polymerization conditions with maleic anhydride or the anhydride groupings contained in the polymer molecule can also be used, in which case the corresponding polymer derivatives are formed. Very favorable results are obtained with the use of non chain transferring solvents, such as benzene or isooctane. Neither the starting products nor the reaction products must be dissolved in the diluent although it is advantageous when the starting products are present in the dissolved state. Benzene is preferred in the process according to the invention because it does not possess a chain transferring action and offers further industrial advantages. As the starting products are soluble in benzene, the reaction mixture is easy to handle and the conditions for the start of the polymerization are good. The copolymer is insoluble in benzene and precipitates in the course of the reaction, so that the subsequent processing is easy to carry out. The copolymer can be separated by filtration, centrifugation or by a similar operation.

The reaction temperature may vary within wide limits and depends on the free radical liberating agents used. Reaction temperatures in the range of from 40 to 120° C. are favorable, although the polymerization may also be carried out at temperatures outside that range.

The polymerization is suitably performed under elevated pressure, pressures ranging from 10 to 100 atmospheres, and particularly pressures below 50 atmospheres being advantageous, although the polymerization may also be carried out under substantially higher pressures.

As compounds providing free radicals during the reaction there can be used all substances that form radicals under the reaction conditions. Suitable compounds are peroxides, for example dialkyl peroxides, alkyl hydroperoxides, diacyl peroxides, percarbonates and azo compounds. The free radical liberating agents are preferably used in an amount in the range of from 1 to 5% by weight, calculated on the weight of the two monomers.

The copolymers according to the invention contain 0.01 to 2.5% by weight of dicyclopentadiene. They are soluble in water and in aqueous solutions of alkalies and ammonia. Even in high dilutions the solutions have high viscosities. When the amount of dicyclopentadiene used in the copolymerization is increased within the specified limits, at first the viscosities of the solutions of the reaction products also increase. With further increase, the viscosity passes a maximum value and with a still higher amount of dicyclopentadiene the viscosities of the solutions diminish again.

The solutions of the copolymers according to the invention are free from swollen bodies and gel particles. They have higher viscosities than comparable solutions of copolymers prepared without the use of dicyclopentadiene.

It is surprising that such a small addition of dicyclopentadiene strongly increases the molecular weight. As compared therewith, other dienes are unsuitable for the manufacture of olefin-maleic anhydride copolymers of high molecular weight. When, for example, dipentene is used instead of dicyclopentadiene as copolymerization component the molecular weight of the polymer is not increased. With the use of comparable amounts of divinyl benzenes important cross-linkings are observed. When the copolymers of this type are transformed into aqueous solutions of the alkali metal or ammonium salts swollen bodies and gel particles are contained in the solution. Moreover, the solutions are turbid and their viscosities are only slightly elevated.

The copolymers according to the invention can be used, especially in the form of their salts, as thickening agents, dispersing agents and emulsifying auxiliaries, as flooding agents for oil wells, auxiliaries for drilling, coating agents, and core binders. They can also be used in the textile field, in paper industries and for cosmetics and pharmaceutics. Finally, they are valuable and reactive intermediates for further reactions, for example with water, alcohols, or amines, whereby the corresponding derivatives of high molecular weight are obtained.

The following examples serve to illustrate the invention but they are not intended to limit it thereto.

Example 1

A 5 liter autoclave provided with stirrer was charged with a solution of 182 grams of maleic anhydride, 7 grams of benzoyl peroxide and the amount of dicyclopentadiene indicated in Table 1 in 1845 grams of benzene. The autoclave was scavenged with pure ethylene until it was free from air and heated to 70° C. Simultaneously ethylene was forced in until the pressure amounted to 50 atmospheres. The pressure and temperature were maintained for 18 hours, while continuously stirring. The pressure was released, the autoclave was opened and the reaction product was removed in the form of a thin, slightly soaked slurry in benzene. The benzene was removed by filtration. The powder obtained was boiled with fresh benzene and filtered off with suction while hot. The reaction product was completely dried and 230 grams of a white loose powder were obtained. The molecular weight was determined by the viscosity of a solution of the ammonium salt (in centistokes). A solution of 0.1% strength by weight of the ammonium salt of the reaction product was measured at 25° C. and pH 9 in a capillary viscometer. The results are listed in Table 1.

Comparative example

The example was carried out as described in Example 1 with the exception that the dicyclopentadiene was replaced by hexadiene-1,5. The results obtained are likewise listed in Table 1.

TABLE

| Ethylene-maleic anhydride hexadiene-1,5 copolymer | | | Ethylene-maleic anhydride-dicyclopentadiene copolymer | | |
|---|---|---|---|---|---|
| Percent by weight hexadiene-1,5 | Mmoles | $\eta_{sz}$ | Percent by weight dicyclopentadiene | Mmoles | $\eta_{sz}$ |
| 0 | 0 | 2.9 | 0 | 0 | 2.9 |
| 0.214 | 2.6 | 3.5 | 0.214 | 1.62 | 4.1 |
| 0.427 | 5.2 | 4.3 | 0.427 | 3.24 | 69.1 |
| 1.28 | 15.6 | 4.8 | 0.855 | 6.48 | 162.0 |
| 2.14 | 26.0 | 5.6 | 1.28 | 9.7 | 372.0 |
| 4.27 | 52.0 | 6.5 | 1.71 | 13.0 | 43.5 |
| 8.55 | 104.0 | 20.3 | 2.14 | 16.2 | 7.75 |

Percent by weight=amount in percent by weight used in the copolymerization, calculated on the reacting monomers; Mmoles=amount in millimoles used in the copolymerization, for 100 grams of reacting monomers; $\eta_{sz}$=viscosity of a solution in centistokes of 100 milligrams of copolymer in 100 milliliters of aqueous ammonia, measured at 25° C. and pH 9.

Example 2

A 5 liter autoclave with stirrer was charged with 182 grams of maleic anhydride, 3 grams of dicyclopentadiene, 7 grams of azoisobutyronitrile and 1845 grams of benzene. Copolymerization was performed under an ethylene pressure of 18 to 20 atmospheres and at a temperature of 70° C. 120 grams of copolymer were obtained. A solution of 100 milligrams of the copolymer in aqueous ammonia had a viscosity of 1.8 centistokes at 25° C. and pH 9.

As compared therewith, a solution of 100 milligrams of a copolymer, prepared in an analogous manner but without dicyclopentadiene, had a viscosity of 0.7 centistoke in aqueous ammonia at 25° C. and pH 9.

Example 3

182 grams of maleic anhydride, 3 grams of dicyclopentadiene and ethylene were copolymerized as described in Example 2 in the presence of 1845 grams of benzene and 7 grams of azoisobutyronitrile. The reaction was performed under a pressure of 300 atmospheres and at 80° C. 220 grams of copolymer were obtained. A solution of 100 milligrams of this copolymer in aqueous ammonia had a viscosity of 26.6 centistokes at 25° C. and pH 9.

As compared therewith, a solution of 100 milligrams of a copolymer, which had been prepared in an analogous manner but without dicyclopentadiene, had a viscosity of 4.3 centistokes in aqueous ammonia at 25° C. and pH 9.

We claim:

1. A process for preparing terpolymers of high molecular weight which comprises polymerizing maleic anhydride, ethylene and 0.1 to 2.5% by weight of dicyclopentadiene, calculated on the amount by weight of the reacting monomers, except dicyclopentadiene, in the presence of a free radical liberating compound and a solvent at temperatures between 40 and 120° C. and under pressures of 10 to 100 atmospheres.

2. A process as claimed in claim 1, which comprises using benzene as a solvent.

3. A process for preparing terpolymers of high molecular weight from maleic anhydride, ethylene and a diene in the presence of a free radical liberating compound and a solvent at temperatures between 40 and 120° C. and under pressures of 10 to 100 atmospheres, which comprises using as diene 0.3 to 1.5% by weight of dicyclopentadiene, calculated on the amount by weight of the reacting monomers, except dicyclopentadiene.

4. A terpolymer consisting essentially of units derived from maleic anhydride, ethylene and from 0.01 to 2.5% by weight of dicyclopentadiene.

5. A terpolymer according to claim 4 having substantially equimolar amounts of units derived from ethylene and maleic anhydride.

References Cited

UNITED STATES PATENTS 3,301,834  1/1967  Christman _____ 260—80.7 XR

JOSEPH L. SCHOFER, *Primary Examiner.*
JOHN KIGHT, *Assistant Examiner.*